(12) United States Patent
McKinney et al.

(10) Patent No.: US 8,461,443 B2
(45) Date of Patent: Jun. 11, 2013

(54) CONTROL OF LIGHT IN RESPONSE TO AN AUDIO SIGNAL

(75) Inventors: Martin Franciscus McKinney, Eindhoven (NL); Janto Skowronek, Eindhoven (NL); Dragan Sekulovski, Eindhoven (NL); Bram Kater, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 159 days.

(21) Appl. No.: 12/445,514

(22) PCT Filed: Oct. 25, 2007

(86) PCT No.: PCT/IB2007/054343
§ 371 (c)(1),
(2), (4) Date: Apr. 14, 2009

(87) PCT Pub. No.: WO2008/053409
PCT Pub. Date: May 8, 2008

(65) Prior Publication Data
US 2010/0071535 A1    Mar. 25, 2010

(30) Foreign Application Priority Data
Oct. 31, 2006  (EP) ..................... 06123265

(51) Int. Cl.
*G10H 1/00* (2006.01)
*G10H 1/36* (2006.01)

(52) U.S. Cl.
USPC ............... 84/612; 84/610; 84/615; 84/634

(58) Field of Classification Search
USPC .......................................................... 84/612
See application file for complete search history.

(56) References Cited

U.S. PATENT DOCUMENTS
2002/0038157 A1* 3/2002 Dowling et al. ............ 700/90
2004/0061668 A1 4/2004 Lin
(Continued)

FOREIGN PATENT DOCUMENTS
GB   2354602 A    3/2001
WO   0199475 A1  12/2001

OTHER PUBLICATIONS

Bruderer et al: "Perception of Structural Boundaries in Popular Music";Proceedings of the 9th International Conference on Music Perceiption and Cognition, Bologna, Italy Aug. 22-26, 2006, pp. 157-162.

(Continued)

*Primary Examiner* — Christopher Uhlir
(74) *Attorney, Agent, or Firm* — Shimokaji & Assoc., PC

(57) ABSTRACT

Method, device and system for generating a light control parameter for controlling light (20), e.g. ambient light, in response to an audio signal (A). The audio signal (A) is analyzed in order to extract a temporal evolution of semantic content of the audio signal (A). A light control parameter is then generated according to the temporal evolution of semantic content of the audio signal (A), either on-line or off-line. This enables generating light that is perceptually aligned with the audio signal, e.g. music. In a preferred embodiment spatial properties of the audio signal (A) are extracted, and separate light control parameters are generated for controlling light sources spatially positioned according to the spatial properties of the audio signal, e.g. for stereo or surround sound systems where light sources are positioned near each loudspeaker. Such embodiment enables spatial correspondence between light and audio. In another preferred embodiment semantically distinct temporal sections of a sequence of the audio signal (A) are determined, e.g. sections of a piece of music, and wherein the light control parameter is generated to reflect these sections of the audio signal (A). Such embodiment enables temporal changes in light that follow perceived changes in e.g. a piece of music. Applications of the described method is e.g. within home entertainment systems, theatres, jukeboxes, bars, restaurants, cinemas and discotheques.

13 Claims, 2 Drawing Sheets

U.S. PATENT DOCUMENTS

| | | | |
|---|---|---|---|
| 2005/0004690 A1* | 1/2005 | Zhang et al. | 700/94 |
| 2005/0185392 A1 | 8/2005 | Walter et al. | |
| 2005/0241465 A1 | 11/2005 | Goto | |
| 2006/0096445 A1 | 5/2006 | Leach | |
| 2006/0137510 A1* | 6/2006 | Cui et al. | 84/464 R |
| 2008/0294444 A1* | 11/2008 | Oh et al. | 704/500 |

OTHER PUBLICATIONS

Cambouropoulos, E.: "Towards a General Computational Theory of Musical Structure"; Ph.D Thesis, University of Edinburgh Faculty of Music and Department of Artificial Intelligence, May 1998, Whole Document.

Frankland et al: "Parsing of Melody:Quantification and Testing of the Local Grouping Rules of Lerdahl and Jackendoff's a Generative Theory of Tonal Music"; Music Perception, Summer 2004, vol. 21, No. 4, pp. 499-543.

Bernstein et al: "The Effects of Randomizing Values of Interaural Disparities on Binaural Detection and on Discrimination of Interaural Correleation"; J. Acoust. Soc. Am. 102 (2), Pt. 1, Aug. 1997, pp. 1113-1120.

Durlach, N.: "Equalization and Cancellatin Theory of Binaural Masking-Level Differences"; The Journal of the Acoustical Society of America, vol. 35, No. 8, Aug. 1963, pp. 1206-1218.

* cited by examiner

CONTROL OF LIGHT IN RESPONSE TO AN AUDIO SIGNAL

FIELD OF THE INVENTION

The present invention relates to the field of signal processing, especially processing of audio signals. More specifically, the invention relates to a method, a signal processor, and a device for processing an audio signal with the purpose of extracting parameters for controlling light sources, e.g. ambient lighting, in response to the audio signal.

BACKGROUND OF THE INVENTION

It is well-known to control light, e.g. ambient light, with the purpose of reflecting properties of an audio signal, e.g. the properties of music with the goal of creating an audio-visual perception of matching light and music. This is done for example at musical concerts, in restaurants, bars and discotheques.

At concerts, complex light sequences are normally carefully planned to perfectly match the musical content and thus manual skills and planning are required to obtain such result. On the contrary, light shows at discotheques or bars are often automatically controlled by detected signal parameters of the music signal. Such light control may be performed by detecting an overall level of the audio signal and adjust intensity of light accordingly, thus creating the overall experience of light flashing along with the beat of the music. Another example is to detect a level of the audio signal in three frequency bands: bass, midrange, and treble, each having assigned a light color whose intensity is controlled by the respective detected levels.

The described automatic light control methods are simple to implement, e.g. in analog electronics, and it is possible to control light on-line in response to an audio signal without an operator available. However, such low-level methods do not provide a universal agreement between musical content and light, especially not for a large variety of audio signals, e.g. classical music versus dance music or speech.

SUMMARY OF THE INVENTION

Hence, it is an object to provide a method and a device that is capable of automatically controlling light, e.g. ambient lighting, so changes in the light correspond perceptually to changes in an audio signal.

This object and several other objects are obtained in a first aspect of the invention by providing a method for generating a light control parameter for controlling light, such as ambient light, in response to an audio signal, the method including:
 analyzing the audio signal in order to extract a temporal evolution of semantic content of the audio signal, and
 generating a light control parameter according to the temporal evolution of semantic content of the audio signal.

By semantic content is understood features based on combinations of and applying reasoning on low level features that are extracted directly from the representation of the audio signal, such as frequency, amplitude and time domain analysis. In addition, contextual information may be applied, if available, to further assist in the extraction of the semantic content of the audio signal.

By light control parameter is understood any information, e.g. software parameter or electrical signal, that can be used to control a light source or a group of light sources with respect to different properties such as brightness, saturation, hue, and their spatial distribution and temporal dynamics.

One advantage of the inventive method is that it becomes possible to control light sources to provide a light effect time aligned with presentation of the audio signal in a way that there is a perceived agreement between the light effect and the content of the audio signal, e.g. a piece of music. Especially it is obtained that changes in the music are properly reflected or underlined by the light, and the method is well suited for automatic control of light for a large variety of audio signals, e.g. different genres of music, while maintaining a good correspondence between music and light.

The method may include the step of playing the audio signal along with controlling ambient light according to the light control parameter.

In one set of embodiments, the method includes extracting spatial properties of the audio signal and generating separate light control parameters for controlling light sources spatially positioned according to the spatial properties of the audio signal. With such embodiments further correspondence between the audio signal and light is possible, since a perceptually important parameter is taken into account, and the auditory image reproduced e.g. in a home hi-fi stereo or surround sound system can be underlined by corresponding light.

Preferably, a number of spatially separate individually controllable light sources are positioned such as to at least cover an auditory image produced by reproduction of the audio signal. Especially, it is preferred to extract spatial properties of an object, such as a musical instrument, in the audio signal and generate the separate light control parameters according to the spatial properties of the object. This enables the possibility of spatially reflecting objects, e.g. instruments, in the audio signal with a special light effect that corresponds to the spatial position in the perceived auditory image, or in other words object specific mapping of light. Especially, the audio signal may include, or represent, a surround sound signal representing three or more channels, wherein separate light control parameters are generated for each of the surround sound channels. Thus, the method is suited for use together with audio systems such as etc. either in home systems or in cinemas. The audio signal may include, or represent, at least two separate channels, such as stereo, Dolby Surround, 5.1, 6.1, 6.2 audio systems.

In another set of embodiments, the method includes determining semantically distinct temporal sections of a sequence of the audio signal, and wherein the light control parameter is generated to reflect these sections of the audio signal. Especially, the determining of the sections of the audio signal includes extracting statistical data relating to at least one property selected from the group consisting of: section boundary, tempo, dynamic variation, musical key. The light control parameter may reflect a characteristic property of the audio signal (A) in each of the sections.

The light control parameter may include information to control at least one light property selected from the group consisting of: brightness, saturation, hue, and their spatial distribution and temporal dynamics.

Analyzing the audio signal and generating the light control parameter may be performed along with presenting the audio signal and controlling a light source according to the light control parameter, i.e. on-line. Alternatively, an off-line solution may be preferred, i.e. to generate the light control parameter according to a sequence of the audio signal, such as a piece of music, storing the light control parameter, and later presenting the sequence of the audio signal along with controlling a light source according to the light control parameter.

In principle the invention can function with any format of the audio signal, i.e. analog or digital, such as a compressed MPEG type audio signal or the like. However, it is preferred to perform the analyzing in the digital domain, and thus it is preferred to convert an analog audio signal into a digital representation prior to performing the analyzing step.

It is appreciated that any two or more of the above-mentioned embodiments or sub aspects of the first aspect may be combined in any way.

In a second aspect, the invention provides a signal processor arranged to generate a light control parameter for controlling light, such as ambient light, in response to an audio signal, the signal processor comprising:

an audio analyzer arranged to extract a temporal evolution of semantic content of an audio signal, and a light parameter control generator arranged to generate a light control parameter according to the temporal evolution of the semantic content of the audio signal.

The signal processor can be implemented in a large variety of ways, such as integrated into one single chip, analyzer and light parameter control generator separated into different chips of devices. Also, the signal processor may be a dedicated signal processor or a general processor such as in a personal computer with software adapted to perform audio analyzing and light parameter generation.

It is appreciated that the same advantages and the same embodiments as mentioned for the first aspect apply as well for the second aspect.

In a third aspect, the invention provides a device comprising a signal processor according to the second aspect. A non-exhaustive list of devices that may have the signal processor of the second aspect integrated is: 1) an audio device such as an audio amplifier, a CD player, a portable audio device or an audio control center, 2) a visual device such as a TV set, a DVD player or a set top box, or 3) a combined audio-visual device such as a hard disk recorder or a media center.

It is appreciated that the same advantages and the same embodiments as mentioned for the first aspect apply as well for the third aspect.

In a fourth aspect, the invention provides a system arranged to generate light, e.g. ambient light, in accordance with an audio signal, the system comprises:

an audio analyzer arranged to extract a temporal evolution of semantic content of an audio signal, a light parameter control generator arranged to generate a light control parameter according to the temporal evolution of the semantic content of the audio signal, at least one loudspeaker for presenting the audio signal, at least one light source for generating light according to the light control parameter.

In an embodiment of the system the audio analyzer and light control generator are arranged to extract spatial properties of the audio signal and generate separate light control parameters for controlling a plurality of spatially separated light sources in accordance with the spatial properties of the audio signal. Especially, the system may include a surround sound system with three or more loudspeakers spatially separated, and accordingly, a number of separately controllable light sources are preferably spatially positioned or scattered such that the auditory image that is covered by the surround sound system is substantially covered so as to be able to generate an impression of spatially following an object in the produced surround sound with a corresponding spatial light effect.

The systems according to the fourth aspect may be applied within a variety of different applications, a non-exhaustive list is: home entertainment systems, jukeboxes, cinemas, theaters, bars, restaurants, concerts, hotel rooms, hotel lounges and discotheques. Light source may be Light Emitting Diodes (LEDs) or groups of LEDs, glow lamps etc. as known in the art.

The system may even be applied portable audio equipment, e.g. "ghetto blasters", where light sources are spatially arranged on extremes of the cabinet housing loudspeakers in order to provide a spatially distributed light effect along with the spatial properties of the audio signal. Especially in embodiments where light control parameters are used to control light sources according to spatial aspects of the audio signal, a portable audio device may have groups of LEDs spatially located towards extremes of its cabinet in order to coordinate light spatially along with the spatial properties of the audio signal reproduced by its loudspeakers. Alternatively or additionally, such device may include spot lights located in or on the cabinet and directed in different directions so as to create an ambient lighting effect perceptually enhancing the spatial impression of the audio signal produced by the loudspeakers.

It is appreciated that the same advantages and the same embodiments as mentioned for the first aspect apply as well for the fourth aspect.

In a fifth aspect, the invention provides a computer executable program code adapted to perform the method according to the first aspect. As mentioned, such program can in principle be executed on dedicated signal processors or general computing hardware. It is appreciated that the same advantages and the same embodiments as mentioned for the first aspect apply as well for the fifth aspect.

In a sixth aspect, the invention provides a computer readable storage medium comprising a computer executable program code according to the fifth aspect. A non-exhaustive list of storage media is: memory stick, a memory card, it may be disk-based e.g. a CD, a DVD or a Blue-ray based disk, or a hard disk e.g. a portable hard disk. It is appreciated that the same advantages and the same embodiments as mentioned for the first aspect apply as well for the sixth aspect.

It is appreciated that advantages and embodiments mentioned for the first aspect also apply for the second, third, fourth, fifth and sixth aspects of the invention. Thus, it is appreciated that any one aspect of the present invention may each be combined with any of the other aspects.

BRIEF DESCRIPTION OF THE FIGURES

The present invention will now be explained, by way of example only, with reference to the accompanying Figures, where.

DETAILED DESCRIPTION OF EMBODIMENTS

Figure 1:
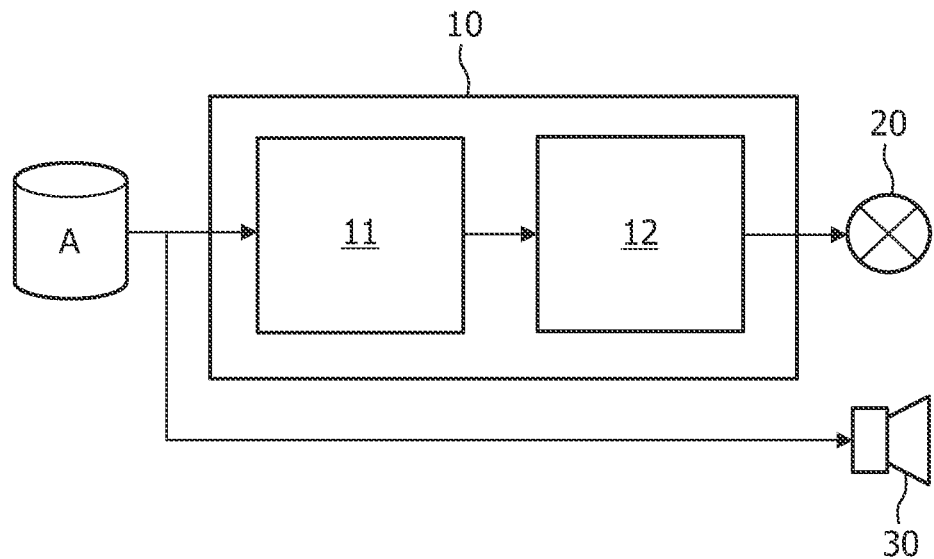
FIG. 1 illustrates a device or system embodiment according to the invention.

FIG. 1 illustrates a system or a device including a signal processor 10 having an audio analyzer 11 arranged to receive an audio signal A, e.g. a digital audio stream such as a compressed digital audio stream according to an MPEG standard. The audio analyzer 11 applies a number of signal processing algorithms on the audio signal A in order to extract basic low-level signal properties of the audio signal A, e.g. based on frequency analysis and temporal analysis of the audio signal A. The audio analyzer 11 then combines these low-level signal properties, if available optionally using additional contextual information, to arrive at an analysis result reflecting a temporal evolution of semantic content in the audio signal A.

A light control parameter generator 12 receives the information regarding the temporal evolution of the semantic content of the audio signal A from the audio analyzer 11, and based thereon it generates a light control parameter reflecting the temporal evolution of semantic content of the audio signal A. Finally, a light source 20 (or a group of light sources, e.g. glow lamps or Light Emitting Diodes (LEDs)) is controlled by the generated light control parameter in order to generate ambient lighting that is temporally aligned with an acoustic presentation of the audio signal A properly amplified and reproduced by a loudspeaker 30. Since the light control parameter is generated according to a temporal evolution of the semantic content of the audio signal A, it is possible to experience a combined audio-visual presentation where the ambient lighting in an "intelligent" or "right" way follows the semantic content of the audio signal A. For example, with the method and system according to the invention it is possible to automatically control ambient lighting that reflects the semantic content of a piece of music independent of the music genre.

With respect to the step of extracting temporal evolution of semantic content of an audio signal, reference is made to the paper "Perception of structural boundaries in popular music", by M. Bruderer, A. G. Kohlrausch and M. F. McKinney, Proceedings of the 9th International Conference on Music Perception and Cognition, 2006, Bologna (see e.g. http://www.icmpc2006.org). This paper describes methods for extracting structural information from the songs. Examples of "boundary cues" of an audio signal representing a piece of music are described. The cues in the audio signal mentioned in the paper to be important with respect to detecting boundaries between semantically distinct sections of a piece of music are: timbre (e.g. of drums, voice), tonality (e.g. harmonic progression, melody change), rhythm (e.g. change in strength, tempo change, rhythm change), structural (e.g. global structure, repetition). In addition, the paper uses two musicological-based models described in "Towards a general computational theory of musical structure", Ph.D. thesis by E. Cambouropoulos, University of Edinburgh, 1998, and "Parsing of melody: Quantification and testing of the local grouping rules of "Lerdahl and Jackendofføs a Generative Theory of Tonal Music"" by B. W. Frankland & A. J. Cohen, Music Perception, 21(4), pp. 499-543, 2004, to extract the distribution of different cues in time: rest, change in length and in register, attack-point (long note in between short notes). Additionally, three other cues were extracted: the introduction and ending of instrumental voices as well as points in time of harmonic resolution. If a song had low temporal correlation between the distributions of the different cues it was deemed a suitable candidate for the experiment (a low temporal correlation allows us to better isolate specific cues of a segment boundary). In the paper it is concluded that it is a general agreement between individuals as to the placement of sections in popular music, and methods are described to extract such sections. Thus, it is preferred also to generate light that changes temporally aligned with such sections of a piece of music since there will exist a general agreement that the light changes "in the right way" to the music.

The method described in connection with the system of FIG. 1 can either be performed on-line, i.e. based on receiving an audio stream A that is at the same time played back via the loudspeaker 30. Alternatively, the signal processing performed by signal processor 10, i.e. 11 and 12 or at least 11, may be performed off-line based on a sequence of an audio signal A, e.g. a piece of music or the content of an entire CD album. The resulting light control parameter as a function of time can then be stored on a computer readable storage medium for later use, i.e. for later control of the light source 20 along with presentation of the audio signal A via loudspeaker 30.

It is appreciated that the signal processing 10 including one of or both of 11 and 12 can be implemented in a variety of ways. The signal processing 10 may be implemented by means of a dedicated signal processor or using the signal processing power of a general computer, e.g. a personal computer. Also the signal processor may be implemented in a stand-alone device or integrated into a device. The device may include one or both of light source(s) 20 and loudspeaker(s) 30.

Figure 2:
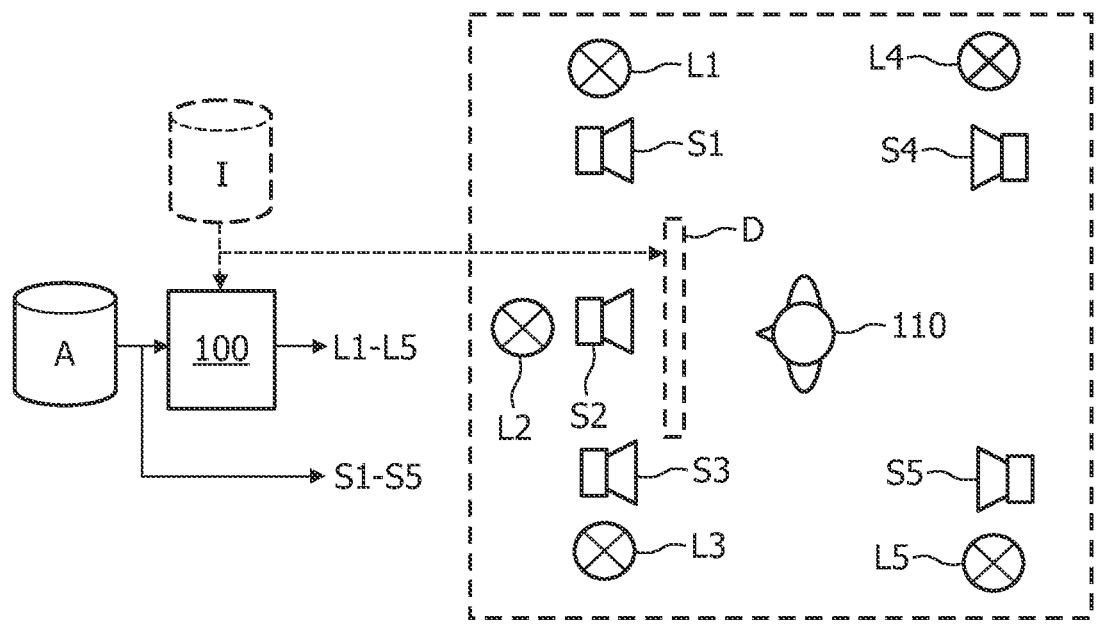
FIG. 2 illustrates a surround sound system embodiment where individually controllable light sources are spatially positioned to cover the range expanded by a set of surround sound loudspeakers.

FIG. 2 illustrates an embodiment of a surround sound setup indicated by a dashed box, where a person 110 is positioned in a surround sound system in the chosen embodiment five loudspeakers S1-S5 are used as example. These loudspeakers S1-S5 that are located spatially separated in order to provide the person with a spatial auditory experience according to the information included in audio signal A that represents five audio channels, e.g. in a digital format. In the illustrated example signal processor 100 extracts separate light control parameters that enables independent control of five light sources (or groups of light sources) L1-L5 in the illustration shown to be spatially located near the loudspeakers S1-S5 so as to perceptually cover the spatial range expanded by the loudspeakers. Of course the number of individually controllable light sources may be considerably larger than the number of audio channels which will enable a more precise spatial light mapping of an object, e.g. a musical instrument, in the audio signal.

With the five light sources L1-L5 spatially scattered in relation to loudspeakers S1-S5, it is possible to control the light sources L1-L5 such that the spatial ambient lighting experience corresponds to the spatial auditory experience when the light sources L1-L5 are controlled along with playback of the audio signal A via loudspeakers S1-S5. For example each of the light sources L1-L5 may be able to produce light with different colors at different intensities. By extracting information of a semantic object in a piece of music, e.g. a guitar, it becomes possible to track, in the audio signal A, a spatial location of the guitar in the auditory image. Thus, e.g. a green light can be used to represent the guitar with an intensity indicating the level of the guitar. When the guitar player walks across the scene in a concert recording the guitar changes position in the auditory image, and a green light can then spatially change accordingly, e.g. from L1 via L2 to L3 along with the movement of the guitar player. This will enhance the total experience for listener/viewer 110.

The invention may be performed on the audio signal part of an audio-visual presentation, e.g. from a DVD etc., that also includes an image signal part I to be presented on a two- or three-dimensional display screen D, e.g. a TV set. These visual elements I, D are illustrated on FIG. 2 with dashed lines since they are optional. In certain embodiments of the signal processor 100 it is arranged to take into account spatial properties of objects in the image I in order to assist the information from the audio signal A for generating light control parameters to control the spatially distributed light sources L1-L5. This can be done to further support the spatial object properties extracted from the audio in generating the light control parameters. For example, if a hero in a movie runs towards the right in the image I with a fire gun, it is possible to produce e.g. flashing red light with low intensity with light source L1 even though the audio signal A has not yet indicated the existence of the fire gun, and then when the fire gun is fired, the loud gun sound mainly produced by loudspeaker S1 can be accompanied by a red light with high intensity from light source L1.

Figure 3:
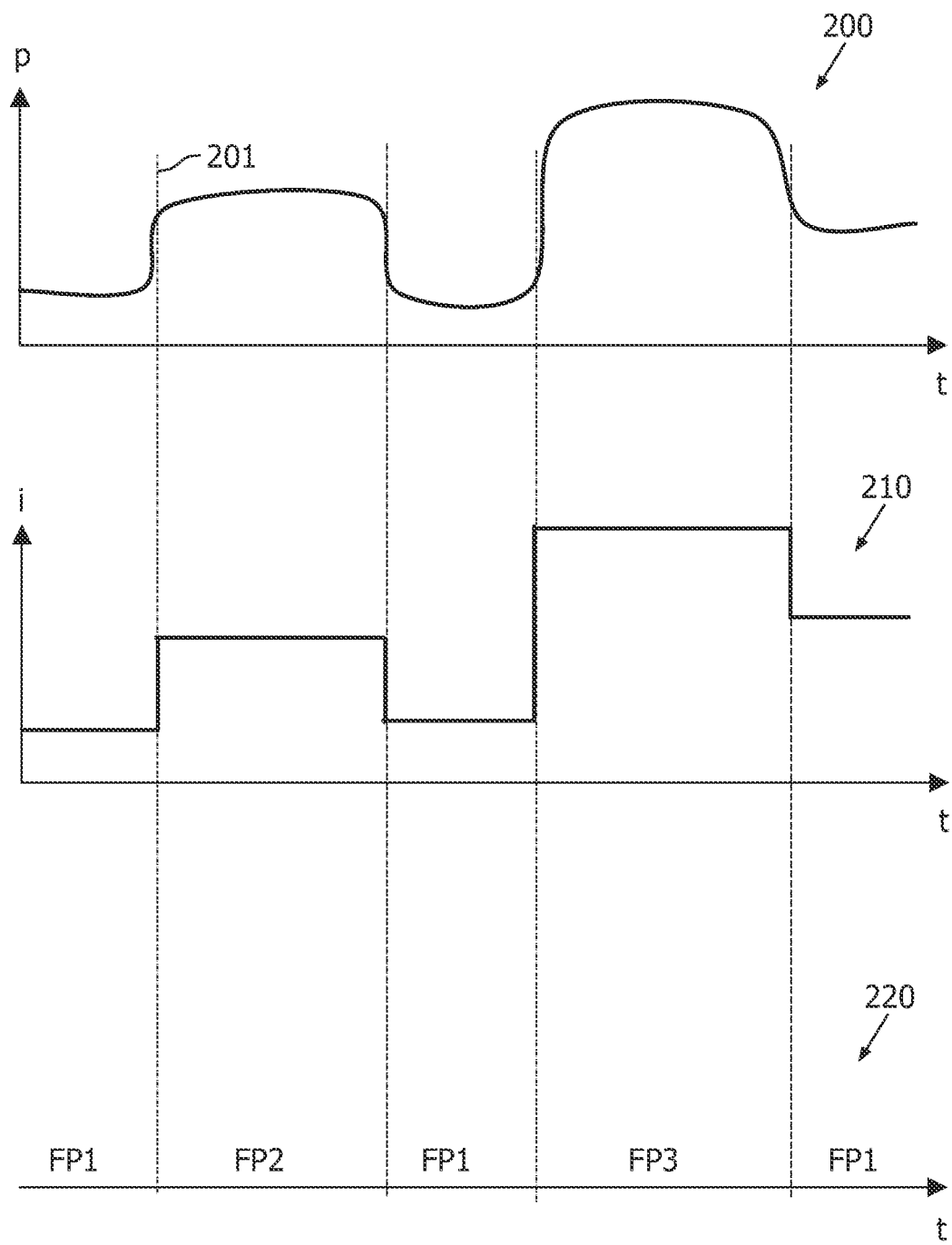
FIG. 3 illustrates examples of methods of light control parameters based on extracted semantically distinct sections of a music sequence.

FIG. 3 illustrates three graphs 200, 210, 220 showing a piece of music as a function of time t split into sections between boundaries 201 indicated with dashed lines. Graph 200 indicates the temporal evolution of a parameter p that can represent e.g. the tempo that has been analyzed and extracted of the piece of music as a function of time. In the example it is seen that the temporal evolution of the tempo seems to correlate with section boundaries 201. Graph 210 illustrates a corresponding light control parameter as a function of time t, this parameter may be e.g. light intensity i. As seen, in the example it is chosen to directly translate the tempo of the music signal into light intensity as it is seen that the light intensity is seen to be controlled in steps corresponding directly to the tempo and with changes corresponding to the extracted section boundaries 201. Graph 220 indicates another light control parameter as a function of time t, namely different flash patterns FP1-FP3. These flash patterns are seen not to directly reflect the tempo of the music, rather it is chosen to change flash patterns FP1-FP3 along with sections depending on whether tempo has increased or decreased compared to the previous section. The flash patterns FP1-FP3 may each be a sequence of changes that differ with respect to flash intensity, flash tempo, spatial distribution of light sources in the flash pattern etc. Thus, altogether FIG. 3 illustrates light control parameters generated so as to change in agreement with extracted sections of the piece of music that reflect the changes in semantic content of the music.

An alternative way to provide a light control parameter is to analyze and divide a musical audio signal into sections depending on whether a detected chord played is major or minor, and then change the overall light color towards blue in sections with minor chords while changing towards a bright yellow in sections where major chords are detected. In further embodiments, a speech recognition algorithm may be applied on the audio signal A in order to extract a semantic content of the lyrics of a song. A simple example may be to recognize specific words and generate a light control parameter accordingly, e.g. so as to turn on light sources visualizing a red heart along with the word "love" appearing in the song.

With respect to embodiments of the invention, where the spatial aspects of the audio signals, a detailed description of one possible method for extracting such spatial aspects is given in the following. For horizontal (binaural) sound localization, three signal parameters are important: the interaural intensity differences, the interaural time difference and the interaural correlation. These parameters should be evaluated as a function of frequency and time, incorporating the limited spectral and temporal resolution of the auditory system. Furthermore, the binaural auditory system can evaluate these signal parameters with only a small amount of interactions as described in "The effects of randomizing values of interaural disparities on binaural detection and on discrimination of interaural correlation." by Leslie R. Bernstein and Constantine Trahiotis, *J. Acoust. Soc. Am.*, 102, pp. 1113-1120, 1997; the actual value of one of these parameters has very little effect on the human sensitivity to changes in the other parameters.

The mentioned parameters are found using the following three stage model:
1) The first stage comprises a peripheral preprocessor. This stage serves to mimic the peripheral signal transductions as observed in the cochlea and the auditory nerve. The relevant stages of the peripheral preprocessor can be summarized as follows.
The cochlea including the basilar membrane is modeled by a third-order gamma tone filter bank, using filters with a bandwidth corresponding to the equivalent rectangular bandwidth (ERB).
The effective signal processing of the inner hair cells is modeled by a half-wave rectifier, followed by a 5th-order low pass filter with a cutoff frequency (−3 dB point) of 770 Hz.
To include the influence of adaptation with various time constants, a chain of five adaptation loops was included.
2) The second stage includes a binaural processor, in which the signals from the left and right ears are compared by so-called EI (Excitation-Inhibition) elements, a framework which is closely related to Durlach's EC-theory ("Equalization and cancellation theory of binaural masking-level differences", J. Acoust. Soc. Am, 35:1206-1218, 1963, by N. I. Durlach). The EI-type elements are described by a characteristic ITD and a characteristic IID. Each EI-type element has an output which is related to the difference of the two input signals (i.e., one input is excitatory, the other one is inhibitory). More specifically, the output consists of the squared difference of the two input signals. The output of the EI elements is temporally smoothed by convolving the output with a double-sided exponential window with a certain equivalent rectangular duration (ERD). By scanning the minimum in the EI activity pattern, the model can extract the IID and ITD of the waveforms at the input of the model. Furthermore, the amount of activity within the minimum is a measure for the maximum cross correlation between the waveforms from left and right channels for each specific frequency region.
3) The third stage of the model includes a central processor, which analyzes differences in the EI activity. This means that if the EI activity for two stimuli is exactly or almost the same, it is assumed that these stimuli result in the same spatial impression.

To summarize, the invention provides a method, device and system for generating a light control parameter for controlling light (20), e.g. ambient light, in response to an audio signal (A). The audio signal is analyzed in order to extract a temporal evolution of semantic content of the audio signal. A light control parameter is then generated according to the temporal evolution of semantic content of the audio signal, either on-line or off-line. This enables generating light that is perceptually aligned with the audio signal, e.g. music. In a preferred embodiment spatial properties of the audio signal are extracted, and separate light control parameters are generated for controlling light sources spatially positioned according to the spatial properties of the audio signal, e.g. for stereo or surround sound systems where light sources are positioned near each loudspeaker. Such embodiment enables spatial correspondence between light and audio. In another preferred embodiment semantically distinct temporal sections of a sequence of the audio signal are determined, e.g. sections of a piece of music, and wherein the light control parameter is generated to reflect these sections of the audio signal. Such embodiment enables temporal changes in light that follow perceived changes in e.g. a piece of music. Applications of the described method is e.g. within home entertainment systems, theatres, jukeboxes, bars, restaurants, cinemas and discotheques.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for generating light control parameters for controlling light in response to an audio signal (A), the method comprising the steps of:
    analyzing the audio signal (A) in order to determine a temporal evolution of semantic content of the audio signal (A) and spatial properties of the audio signal (A), wherein said semantic content is determined based on at least one low level feature that is extracted from the audio signal (A), said low level features being selected from the group consisting of timbre and tonality; and
    generating separate light control parameters for controlling spatially positioned light sources according to the spatial properties of the audio signal (A), wherein the separate light control parameters are generated according to the temporal evolution of semantic content of the audio signal (A),
wherein said method further comprises the step of:
    determining semantically distinct temporal sections of a sequence of the audio signal (A),
    and wherein the light control parameters are generated to reflect these sections of the audio signal (A).

2. The method as claimed in claim 1, wherein said method further comprises the step of:
    playing the audio signal (A) along with controlling ambient light (20) according to the light control parameters.

3. The method as claimed in claim 1, wherein said method further comprises the step of:
    extracting spatial properties of an object in the audio signal (A) and generating the separate light control parameters according to the spatial properties of the object.

4. The method as claimed in claim 1, wherein the step of determining of the sections of the audio signal (A) includes extracting statistical data relating to at least one property selected from the group consisting of: section boundary, tempo, dynamic variation, musical key.

5. The method as claimed in claim 1, wherein the light control parameters reflect a characteristic property of the audio signal (A) in each of the sections.

6. The method as claimed in claim 1, wherein the light control parameters include information to control at least one light property selected from the group consisting of: brightness, saturation, hue, and their spatial distribution and temporal dynamics.

7. The method as claimed in claim 1, wherein the step of analyzing the audio signal (A) and generating the light control parameter is performed along with presenting the audio signal (A) and controlling the light sources (20) according to the light control parameters.

8. The method as claimed in claim 1, wherein said method further comprises the step of:
    generating the light control parameters according to a sequence of the audio signal (A) storing the light control parameter, and later presenting the sequence of the audio signal (A) along with controlling the light sources (20) according to the light control parameters.

9. A signal processor (10) arranged to generate light control parameters for controlling light in response to an audio signal (A), the signal processor comprising:
    an audio analyzer arranged to determine a temporal evolution of semantic content of an audio signal (A) and spatial properties of the audio signal (A), wherein said semantic content is determined based on at least one low level feature that is extracted from the audio signal (A), said low level features being selected from the group consisting of timbre and tonality; and
    a light parameter control generator arranged to generate separate light control parameters for controlling spatially positioned light sources according to the spatial properties of the audio signal (A), wherein the separate light control parameters are generated according to the temporal evolution of the semantic content of the audio signal (A),
    wherein said audio analyzer determines semantically distinct temporal sections of a sequence of the audio signal (A),
    and wherein the light parameter control generator generates the light control parameters to reflect these sections of the audio signal (A).

10. The signal processor as claimed in claim 9, wherein said signal processor is further arranged to extract spatial properties of an object in the audio signal (A) and generate the separate light control parameters according to the spatial properties of the object.

11. A device comprising the signal processor as claimed in claim 9.

12. A system arranged to generate light in accordance with an audio signal (A), the system comprises:
    an audio analyzer arranged to determine a temporal evolution of semantic content of an audio signal (A) and spatial properties of the audio signal (A), wherein said semantic content is determined based on at least one low level feature that is extracted from the audio signal (A), said low level features being selected from the group consisting of timbre and tonality;
    a light parameter control generator arranged to generate separate light control parameters for controlling spatially positioned light sources according to the spatial properties of the audio signal (A), wherein the separate light control parameters are generated according to the temporal evolution of the semantic content of the audio signal (A);
    at least one loudspeaker for presenting the audio signal (A); and
    a plurality of spatially separated light sources for generating light according to the light control parameters,
    wherein said audio analyzer determines semantically distinct temporal sections of a sequence of the audio signal (A),
    and wherein the light parameter control generator generates the light control parameters to reflect these sections of the audio signal (A).

13. A non-transitory computer-readable storage medium comprising a computer program including a set of instructions executable by a processor, the medium comprising code for generating a light control parameter for controlling light in response to an audio signal (A), the code further comprising:
    code for analyzing the audio signal (A) in order to determine a temporal evolution of semantic content of the audio signal (A) and extracting spatial properties of the audio signal (A), wherein said semantic content is determined based on at least one low level feature that is extracted from the audio signal (A), said low level features being selected from the group consisting of timbre and tonality; and code for generating separate light control parameters for controlling spatially positioned light sources according to the spatial properties of the audio signal (A), wherein the separate light control parameters are generated according to the temporal evolution of semantic content of the audio signal (A), wherein said code for analyzing the audio signal causes the processor to determine semantically distinct temporal sections of a sequence of the audio signal (A), and wherein the code for generating separate light control parameters causes the processor to generate the light control parameters to reflect these sections of the audio signal (A).

* * * * *